United States Patent
Wu et al.

(10) Patent No.: US 10,145,721 B2
(45) Date of Patent: Dec. 4, 2018

(54) FLEXIBLE FLOAT-TYPE LIQUID LEVEL MEASUREMENT DEVICE

(71) Applicant: FINETEK Co., Ltd., New Taipei (TW)

(72) Inventors: Kuei-Yung Wu, New Taipei (TW); Chih-Wen Wang, New Taipei (TW); Yoyen Luo, New Taipei (TW); Ting-Kuo Wu, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 145 days.

(21) Appl. No.: 15/396,688

(22) Filed: Jan. 2, 2017

(65) Prior Publication Data
US 2018/0188100 A1    Jul. 5, 2018

(51) Int. Cl.
*G01F 23/76*   (2006.01)
*G01F 23/60*   (2006.01)

(52) U.S. Cl.
CPC .............. *G01F 23/76* (2013.01); *G01F 23/60* (2013.01)

(58) Field of Classification Search
CPC ................................. G01F 23/76; G01F 23/60
See application file for complete search history.

(56) References Cited

U.S. PATENT DOCUMENTS

| | | | | |
|---|---|---|---|---|
| 5,986,449 A | * | 11/1999 | Koski | G01F 23/2963 324/207.13 |
| 6,802,218 B2 | * | 10/2004 | Patel | G01F 23/2963 324/207.13 |

* cited by examiner

*Primary Examiner* — David Z Huang
(74) *Attorney, Agent, or Firm* — Chun-Ming Shih; HDLS IPR Services

(57) ABSTRACT

A flexible float-type liquid level measurement device includes an outer tube securement member, a signal connection module, a flexible outer tube, a suspension member, a flexible supporting unit and a magnetic floating ball. The signal connection module is arranged on one end of the outer tube securement member. The flexible outer tube is connected to the outer tube securement member. The suspension member is connected to another end of the flexible outer tube. The flexible supporting unit is arranged inside the flexible outer tube, and the flexible supporting unit includes one end connected to the outer tube securement member and another end connected to the suspension member. The magnetic floating ball is moveably mounted onto the flexible outer tube. Accordingly, the elongated deformation of the flexible outer tube can be prevented while the measurement accuracy and useful lifetime of the measurement device can be increased.

15 Claims, 10 Drawing Sheets

# FLEXIBLE FLOAT-TYPE LIQUID LEVEL MEASUREMENT DEVICE

BACKGROUND OF THE INVENTION

Field of the Invention

The present invention is related to a liquid level measurement device, in particular, to a flexible float-type liquid level measurement device that is acid and alkali resistant, high pressure resistant and capable of effectively preventing the flexible outer tube from elongated deformations.

Description of Related Art

The currently existing flexible object float-type liquid level detector is an elongated probe module, which utilizes an engineering plastic tube or rubber tube with flexibility as the outer tube for the detecting probe, and it is also able to achieve the effect of being bendable and resistance to strong acid and alkaline. The internal of the engineering plastic tube or rubber tube is installed with an electronic detection module, and its bottom is mounted with a column plug in order to form a sealed space for the engineering plastic tube or rubber tube; thereby, the electronic detection module inside the tube is protected from erosion and damage.

Under the state of actual use, the flexible article liquid level detector is installed on top of a storage tank, and the engineering plastic tube or rubber tube is inserted into the storage tank for detecting the article liquid level. To reduce the wobbling or shaking of the engineering plastic tube or rubber tube entering into the material or liquid contained inside the storage tank, a heavy object is suspended at a through hole on the column plug in order to allow the engineering plastic tube or rubber tube to extend and straighten along the direction of the weight of the heavy object. However, under the pulling force exerted by weight of the heavy object and the column plug on the material of the engineering plastic tube and rubber tube for a long period of time, the engineering plastic tube or rubber rube tends to gradually deform with elongation, which causes the magnetic floating ball of the engineering plastic tube or rubber tube and the detection element of the electronic detection module fail to match with each other such that the measurement precision is reduced.

In view of the drawbacks of poor usage stability and insufficient structure associated with the currently existing known art, it is an objective of the inventor of the present invention to provide a solution capable of overcoming the aforementioned problems through years of research along with the utilization of theoretical principles.

SUMMARY OF THE INVENTION

One of the objectives of the present invention is to provide a flexible float-type liquid level measurement device capable of effectively preventing the flexible outer tube from elongated deformations while increasing the measurement accuracy thereof at the same time.

To achieve the aforementioned objective, the present invention provides a flexible float-type liquid level measurement device comprising an outer tube securement member, a signal connection module, a flexible outer tube, a suspension member, a flexible supporting unit and a magnetic floating ball. The signal connection module is arranged on one end of the outer tube securement member. The flexible outer tube includes one end connected to the outer tube securement member, and the flexible outer tube includes a detection module installed therein. The detection module is electrically connected to the signal connection module. The suspension member is connected to another end of the flexible outer tube. The flexible supporting unit is arranged inside the flexible outer tube, and the flexible supporting unit includes one end connected to the outer tube securement member and another end connected to the suspension member. The magnetic floating ball is moveably mounted onto the flexible outer tube such that when the suspension member pulls the flexible outer tube, a force is exerted onto the flexible supporting unit in order to support the flexible outer tube.

In the present invention, the outer tube securement member comprises a cover, a metal outer tube connected to the cover and a metal securement seat arranged inside the metal outer tube. The flexible supporting unit is connected to a first securement member, the upper securement hole comprises a first upper hole and a second upper hole connected to each other. The suspension member comprises a second connector cap, a second connector seat connected to the second connector cap and a plug. The plug further comprises a column seat, column member inserted onto the column seat and a lower securement hole formed on the column member.

In a preferred embodiment, the present invention further comprises a protective flexible tube for protecting the detection module, a first connector cap mounted onto the protective flexible tube and a first connector seat connected to the first connector cap; wherein a length of the protective flexible tube is smaller than a length of the flexible outer tube. By mounting the proactive flexible tube onto the flexible outer tube, the flexible outer tube is made stiffer without bending with ease in order to protect the detection module therein from damages.

In addition, two ends (first securement member and the second securement member) of the flexible supporting unit are secured via the upper securement hole and the lower securement hole. When the first connector cap or the second connector cap are fastened onto the first connector seat or the second connector seat respectively, the flexible outer tube is able to clamp onto the outer tube securement member or the suspension member. At this time, the flexible supporting unit is able to linearly connected to the outer tube securement and the suspension member in order to prevent the situation where the flexible outer tube deforms with elongation due to the weight of the heavy object or the own weight of the flexible float-type liquid level measurement device after a long period of time; therefore, the tensile strength is increased and the useful lifetime is prolonged.

DETAILED DESCRIPTION OF THE INVENTION

Figure 1:
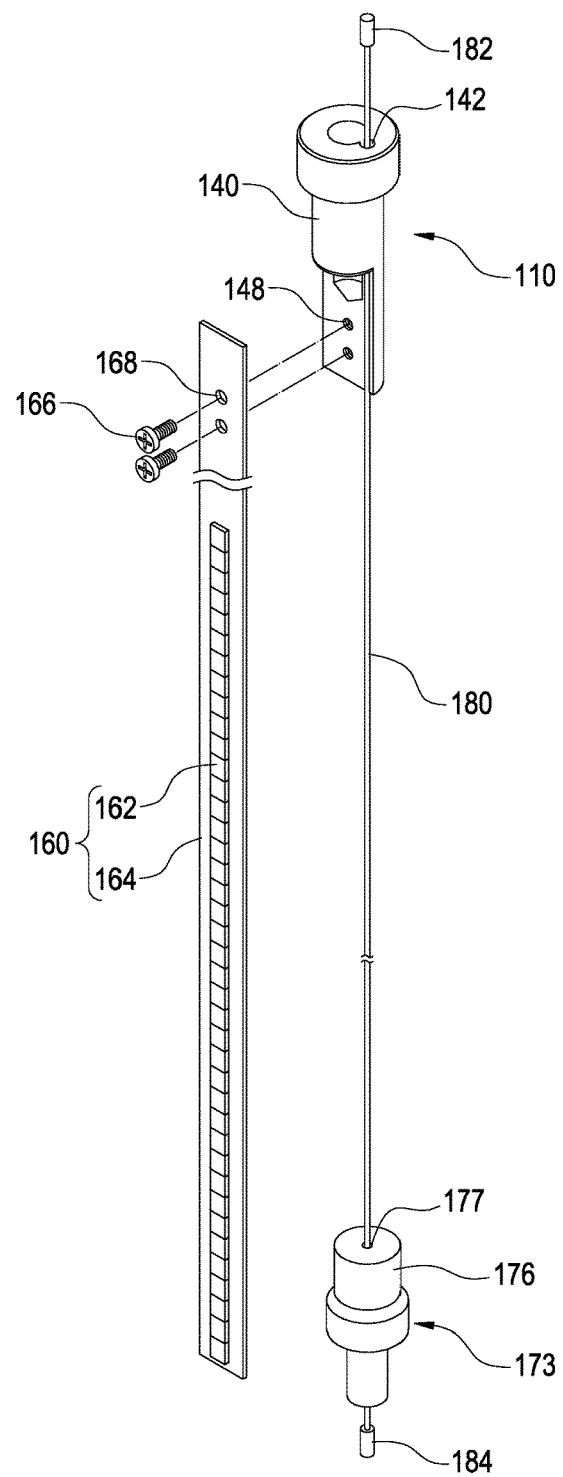
FIG. 1 is an exploded view of the detection module of the present invention installed on the outer tube securement member.

The following provides a detailed description on the present invention and the technical content thereof along with the accompanied drawings. However, it shall be understood that the accompanied drawings are provided for reference and illustrations only such that they shall not be used as limitations of the present invention.

As shown in FIG. 1 to FIG. 6 and FIG. 10, the present invention provides a flexible float-type liquid level measurement device 100, comprising an outer tube securement member 110, a signal connection module 102, a flexible outer tube 150, a suspension member 170, a flexible supporting unit 180 and a magnetic floating ball 210. The signal connection module 102 recited here includes elements, such as control circuit (not labeled) etc., therein in order to perform relevant computation functions. The material of the flexible outer tube 150 is preferable to be made of a plastic tube capable of resisting strong acid and alkaline level or other appropriate material. The flexible supporting unit 180 comprises but not limited to steel cable.

Figure 6:
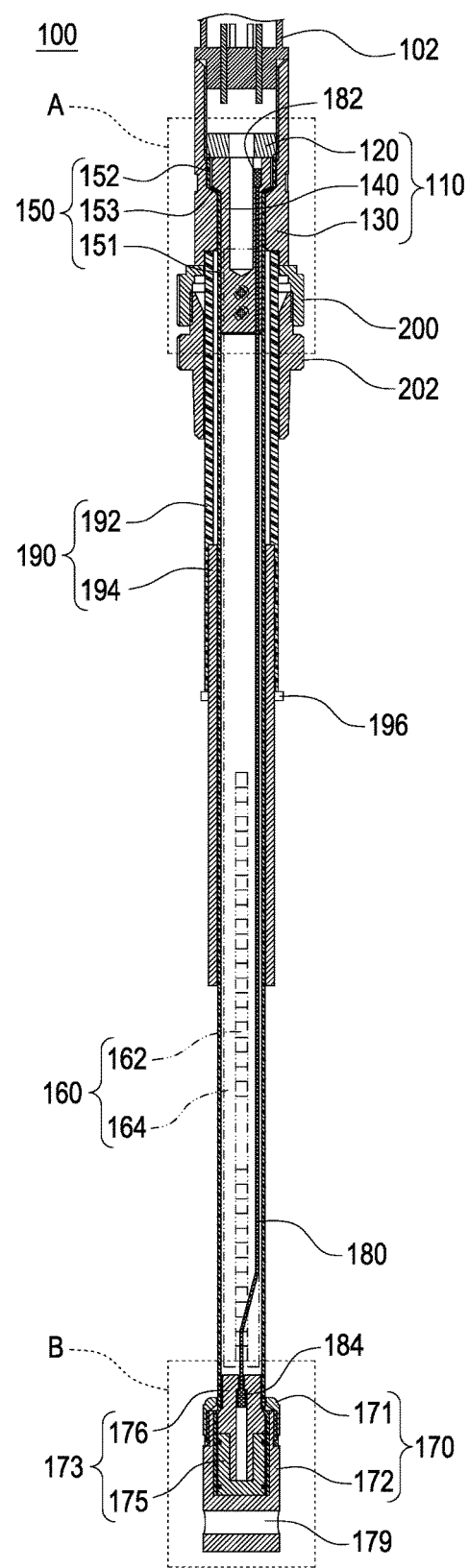
FIG. 6 is a cross sectional view of the flexible float-type liquid level measurement device of the present invention.

The signal connection module 102 is arranged on one end of the outer tube securement member 110 (as shown in FIG. 6). One end of the flexible outer tube 150 is connected to the outer tube securement member 110, and the internal of the flexible outer tube 150 includes a detection module 160 arranged therein. The detection module 160 uses, for example, electrical wires (not shown in the drawings) for electrically connecting to the signal connection module 102. The detection module 160 comprises a circuit board 164 and a plurality of detection units 162 disposed thereon, such that based on the changes of resistors (not shown in the drawings) and magnets (not shown in the drawings) between each detection unit 162 and the magnetic floating ball 210, signals can be transmitted to the signal connection module 102. The aforementioned each detection unit 162 preferably includes but not limited to a reed switch.

Figure 7:
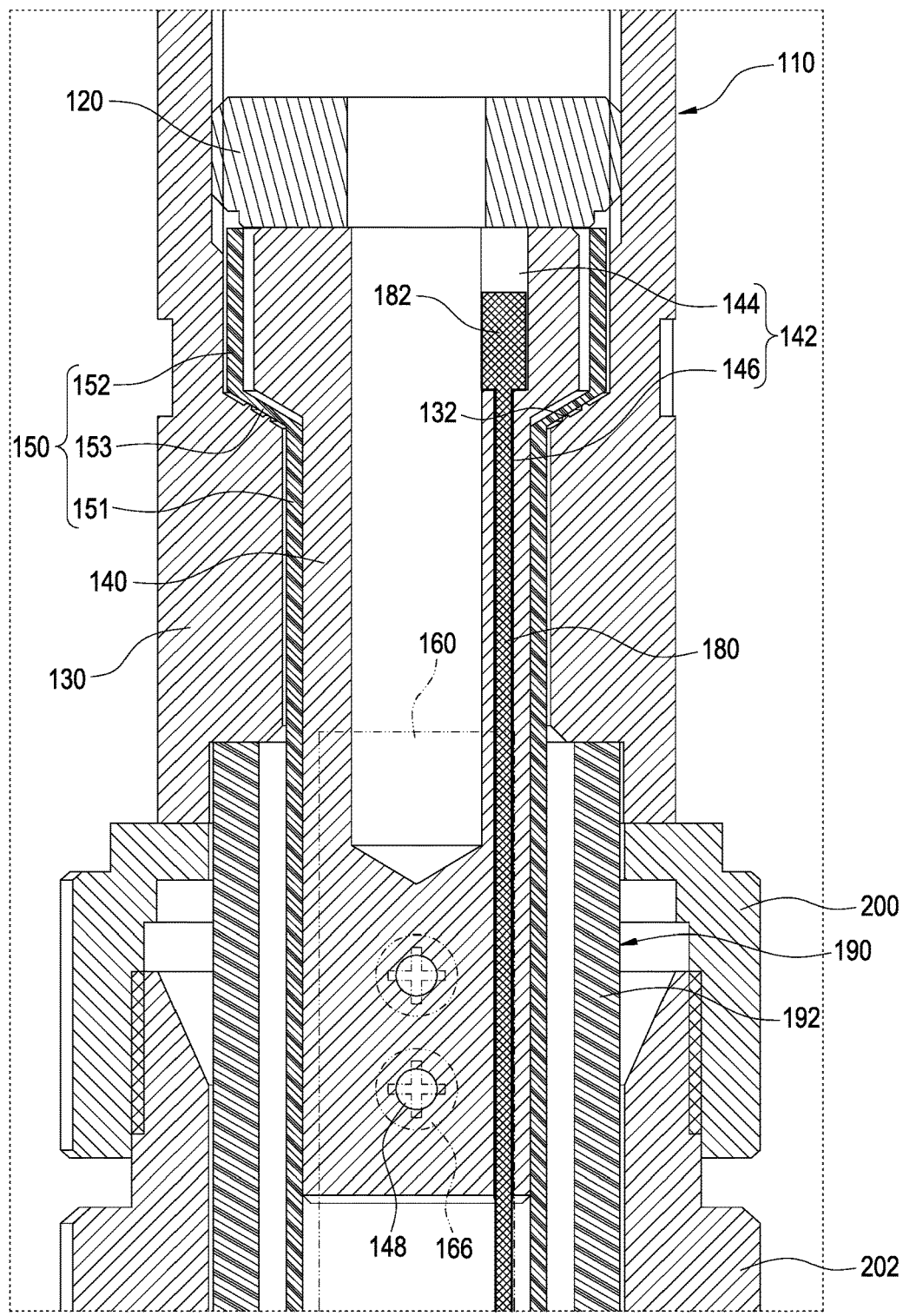
FIG. 7 is a partially enlarged view of Part A in FIG. 6.
Figure 8:
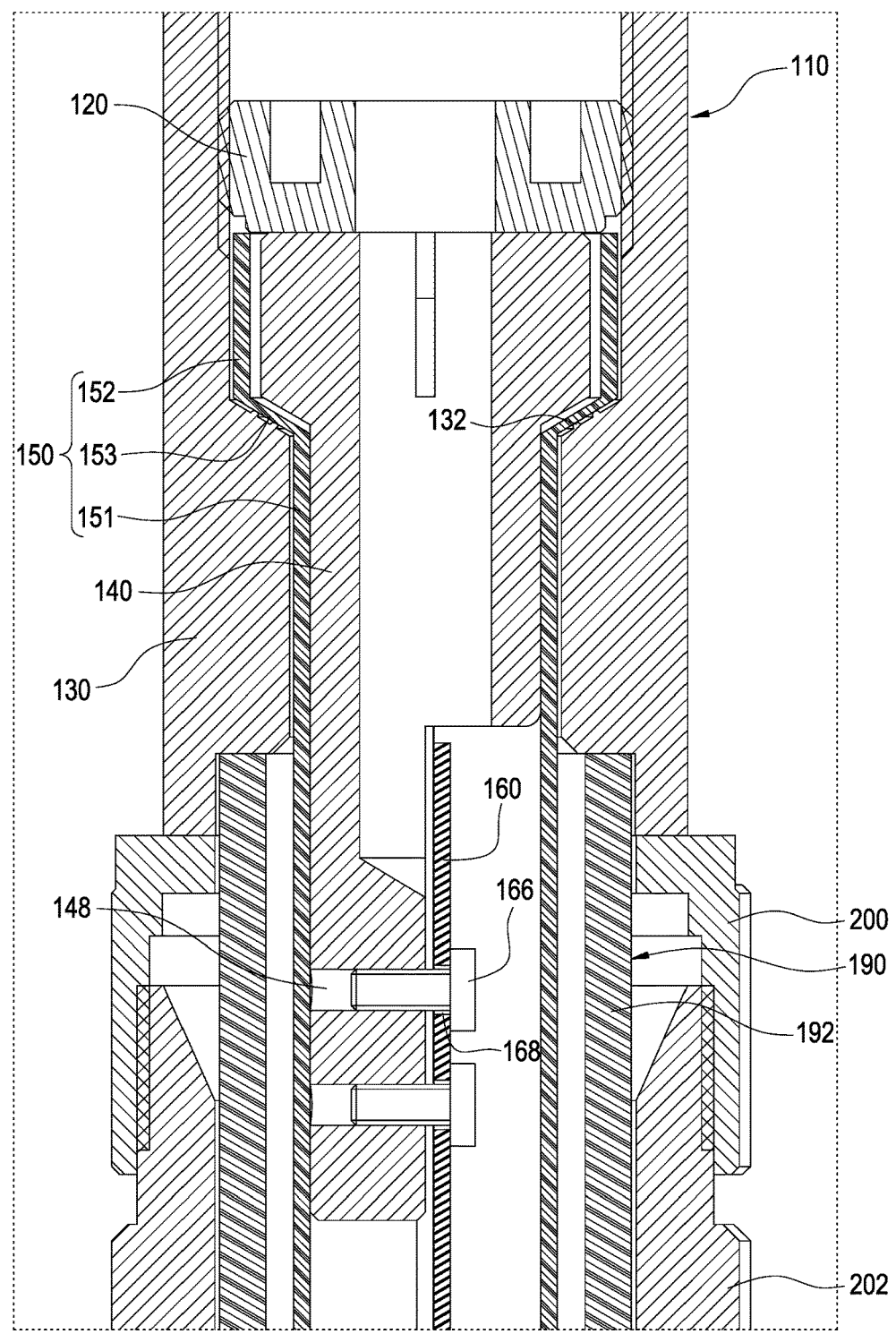
FIG. 8 is another partially enlarged view of Part A in FIG. 6.

Please refer to FIG. 7 and FIG. 8. The outer tube securement member 110 further comprises a cover 120, a metal outer tube 130 connected to the cover and a metal securement seat 140 arranged inside the metal outer tube 130. In this embodiment, the cover 120 is preferably fastened onto a screw nut of the metal outer tube 130. The flexible outer tube 150 is clamped between the metal outer tube 130 and the metal securement seat 140. The metal securement seat 140 includes an upper securement hole 142 formed thereon and provided for one end of the flexible supporting unit 180 to be positioned thereon.

One end of the flexible supporting unit 180 is connected to a first securement member 182. The upper securement hole 142 comprises a first upper hole 144 and a second upper hole 146 connected to each other. The first securement member 182 is positioned on the first upper hole 144 and abuts against the top end of the second upper hole 146. The flexible supporting unit 180 penetrates through the second upper hole 146. As shown in FIG. 7, the inner diameter of the first upper hole 144 is greater than the inner diameter of the second upper hole 146 in order to allow the first securement member 182 to be positioned on the first upper hole 144.

Figure 2:
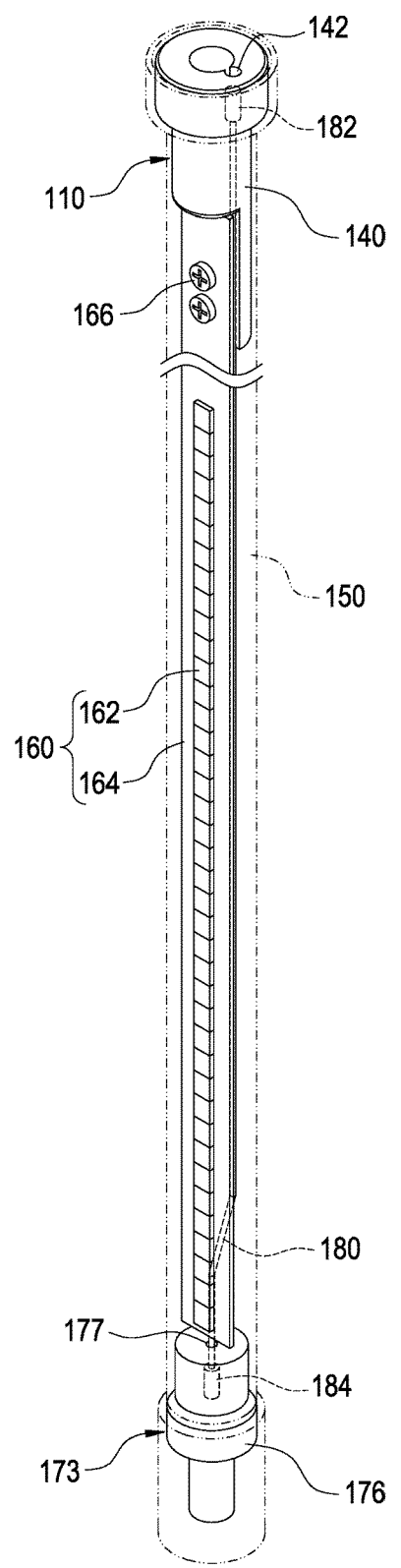
FIG. 2 is a perspective view of the detection module of the present invention installed on the outer tube securement member.

In addition, the metal securement seat 140 further includes a through hole 148, the detection module 160 uses an fastening member 166 to penetrate into the through hole 148 in order to be attached onto the metal securement seat 140. In the embodiment as shown in FIG. 1 and FIG. 2, the detection module 160 further includes assembly holes 168 corresponding to the through holes 148 in order to facilitate fastening members 166, such as screws or bolts etc. to penetrate through the assembly hole 168 and the through hole 148 respectively for fastening the detection module 160 onto the metal securement seat 140 firmly.

In the embodiment as shown in FIG. 7 and FIG. 8, the flexible outer tube 150 further includes a tube member 151, a first expanded portion 152 mounted onto the end portion of the metal securement seat 140 and a first tapered section 153 connected to the tube member 151 and the first expanded portion 152. The tubular diameter of the first expanded portion 152 is greater than the tubular diameter of the tube member 151. The metal outer tube 130 further includes an air-tight structure 132 corresponding to the first tapered section 153.

In this embodiment, the air-tight structure 132, for example, includes a plurality of protrusions circumferencing the inner wall of the metal outer tube 130. Therefore, when the metal securement seat 140 and air-tight structure 132 of the metal outer tube 130 are clamped onto the first tapered section 153 of the flexible outer tube 150 together, the first tapered section 153 then generates deformation due to the shape of the air-tight structure 132. Consequently, it is able to enhance the effects of positioning, waterproof and erosion due to the liquid 20 etc.

Figure 3:
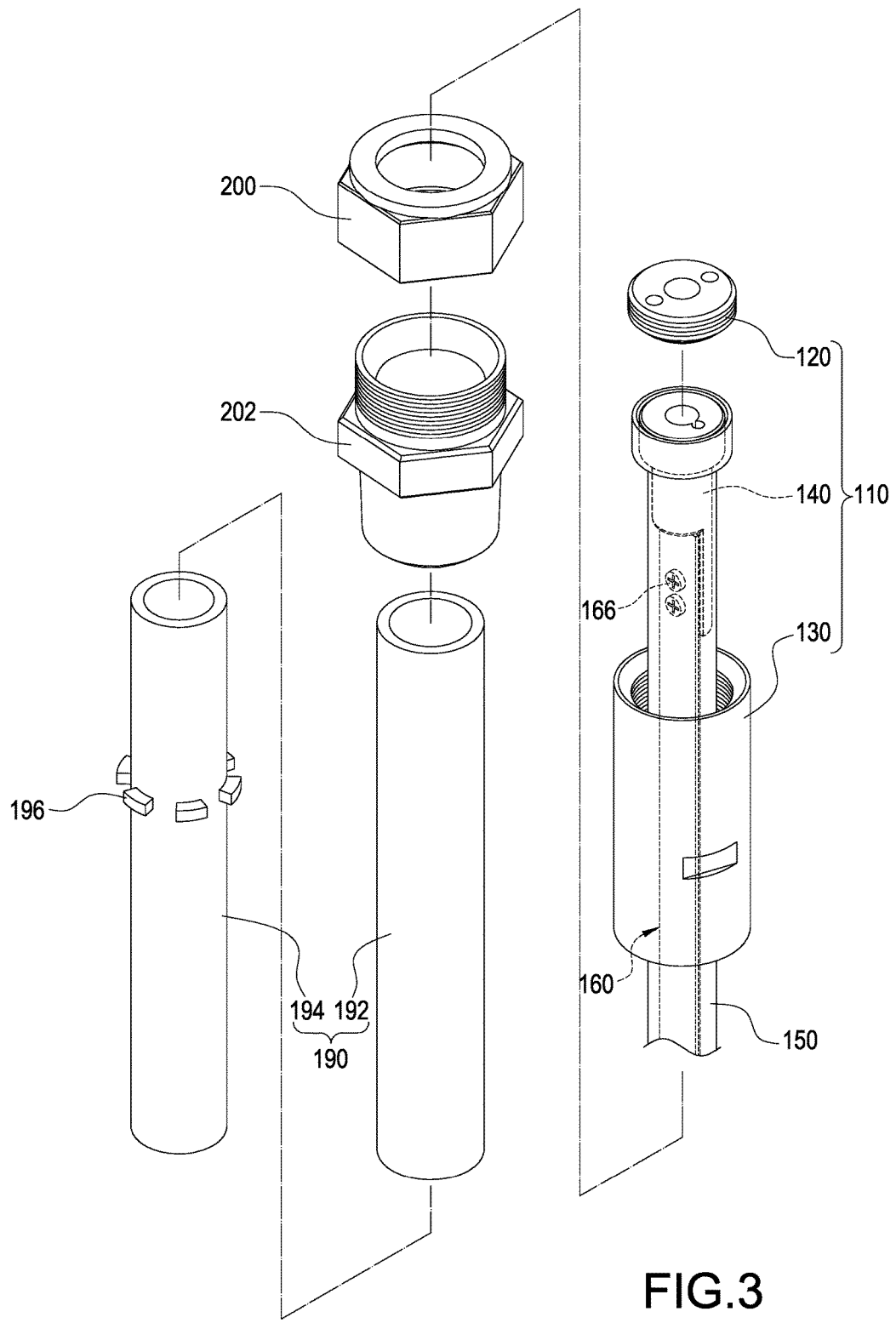
FIG. 3 is an exploded view of the outer tube securement member and protective flexible tube of the present invention.
Figure 5:
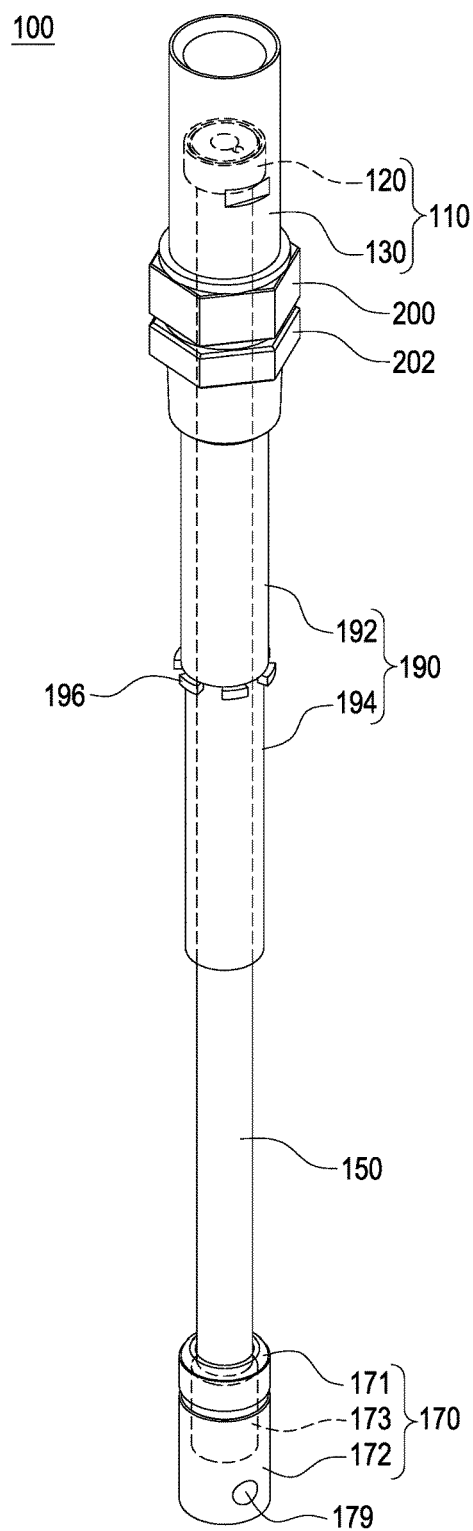
FIG. 5 is a perspective view of the flexible float-type liquid level measurement device of the present invention.

As shown in FIG. 3 an FIG. 5, in this embodiment, it further comprises a protective flexible tube 190 for protecting the detection module 160, a first connector cap 200 mounted onto the protective flexible tube 190 and a second connecter seat 202 connected to the first connector cap 200; wherein the length of the protective flexible tube 190 is smaller than the length of the flexible outer tube 150. In other words, by further mounting the protective flexible tube 190 onto the flexible outer tube 150, the flexible outer tube 150 is stiffer without bending with ease such that the detection module 160 arranged therein can be protected from damages. The material of the protective flexible tube 190 can also be a plastic tube resistant to strong acid or alkaline level or other appropriate materials.

The protective flexible tube 190 further comprises a first flexible tube 192 and a second flexible tube 194 mounted onto the first flexible tube 192. The outer wall of the second flexible tube 194 includes a blocking portion 196 circumferencing thereon. The blocking portion 196 is provided to abut against one end of the first flexible tube 192. Another end of the first flexible tube 192 abuts against the metal outer tube 130 of the outer tube securement member 110, as shown in FIG. 7 and FIG. 8. The metal outer tube 130 is mounted onto the first flexible tube 192 and abuts against the first connector cap 200 at the same time. When one end of the first connector seat 202 is fastened on the first connector cap 200, such as a screw nut, the effect of the screw rotation is able to push the metal outer tube 130 to move toward the direction of the cap 120. The metal outer tube 130 further pushes the metal securement seat 140, and at the same time, it is able to clamp the flexible outer tube 140 between the metal outer tube 130 and the metal securement seat 140.

Moreover, alternatively, when the cap 120 moves toward the direction of the first connector cap 200 for fastening onto the metal outer tube 130, the effect of the screw rotation can also allow the cap 120 to continuously push the metal securement seat 140. Accordingly, with such operation, the flexible outer tube 150 can also be firmly clamped between the metal outer tube 130 and the metal securement seat 140.

Figure 10:
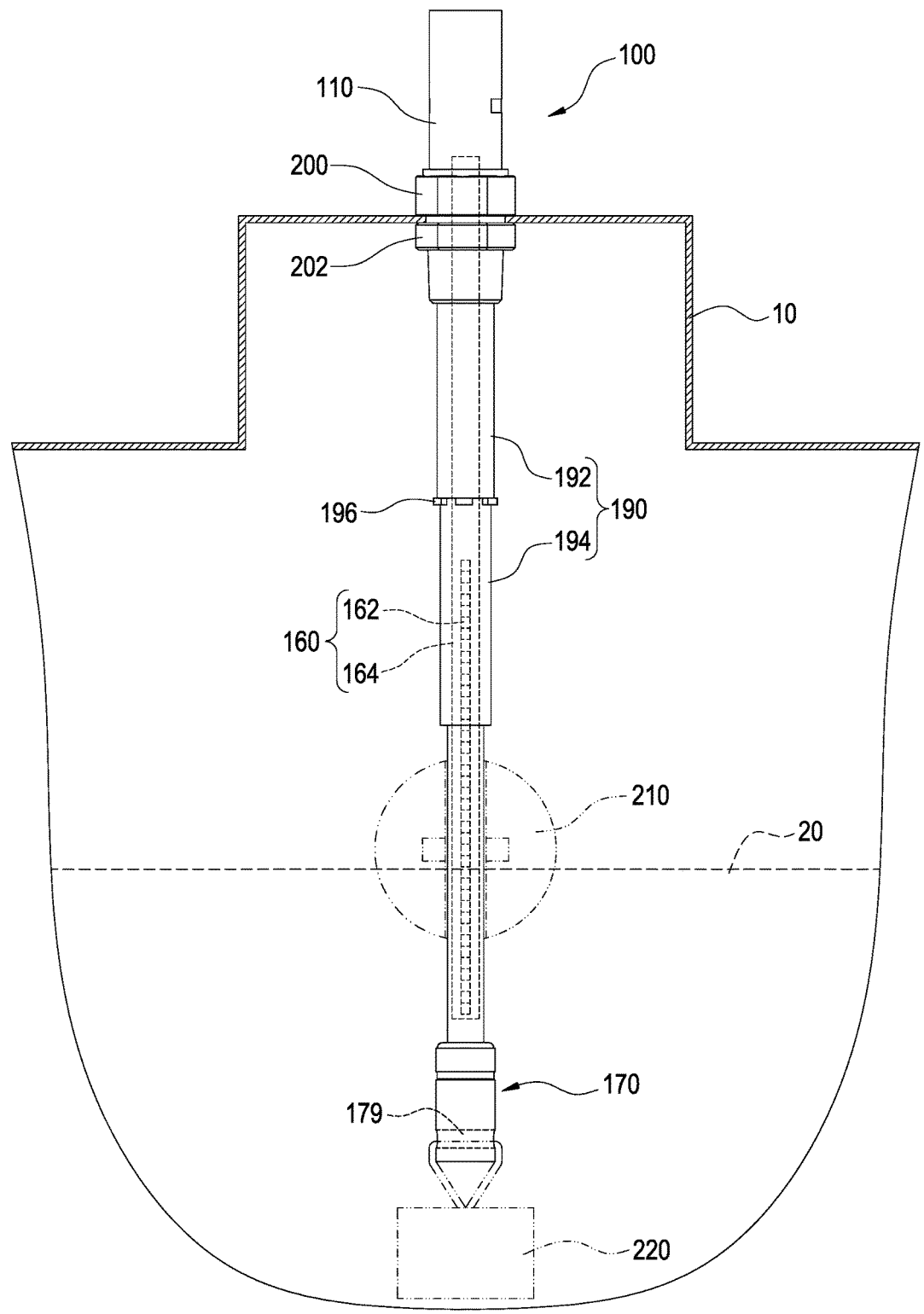
FIG. 10 is a schematic view showing an implementation of the flexible float-type liquid level measurement device of the present invention.

Please refer to FIG. 10, showing a schematic view of the implementation of the flexible float-type liquid level measurement device of the present invention. The flexible float-type liquid level measurement device 100 of the present invention is preferably installed on top of a storage tank 10 for containing a liquid 20 related to the fields of petroleum processing, food processing, chemicals, water processing, medicament production, electric power, paper manufacturing, steelmaking, ships and furnace etc. in order to use measure, control and monitor the liquid. When the first connector cap 200 is fastened onto the first connector base 202, it is able to achieve the effect of fastening the flexible outer tube 150 and securing it onto the storage tank 10.

Figure 4:
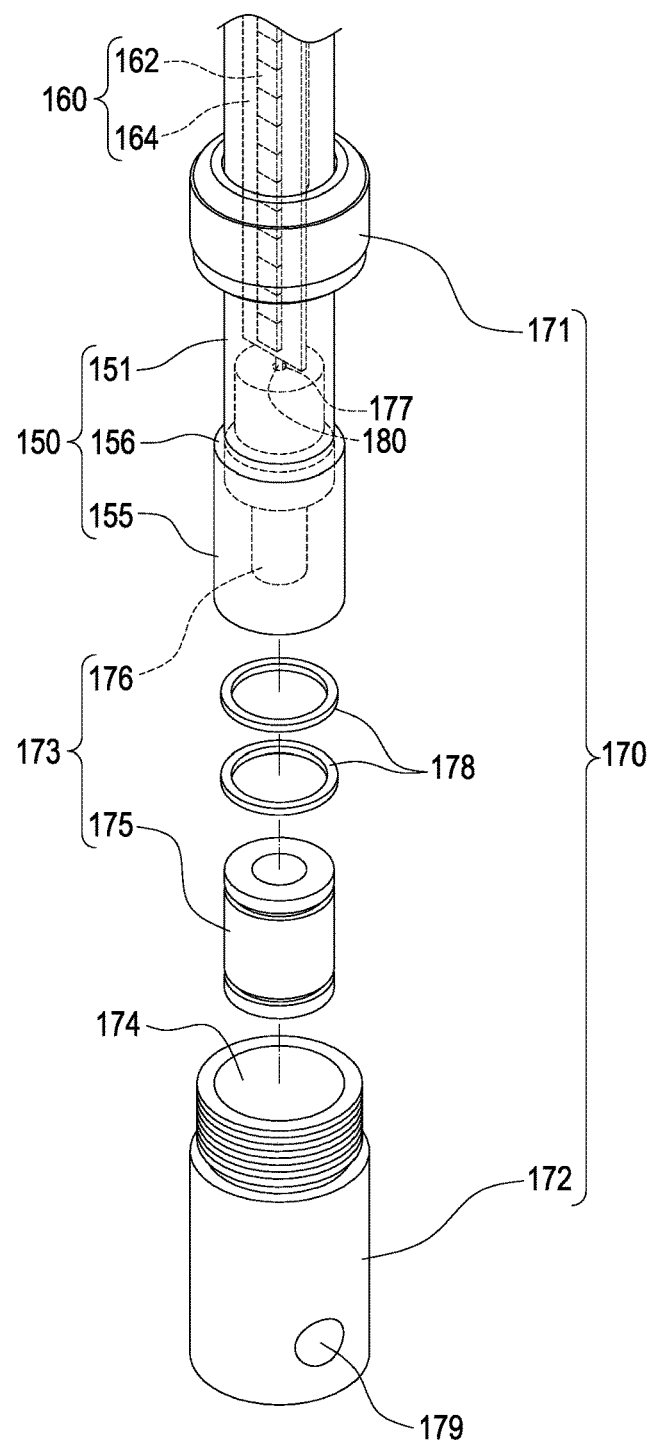
FIG. 4 is an exploded view of the suspension member connected to one end of the flexible outer tube of the present invention.
Figure 9:
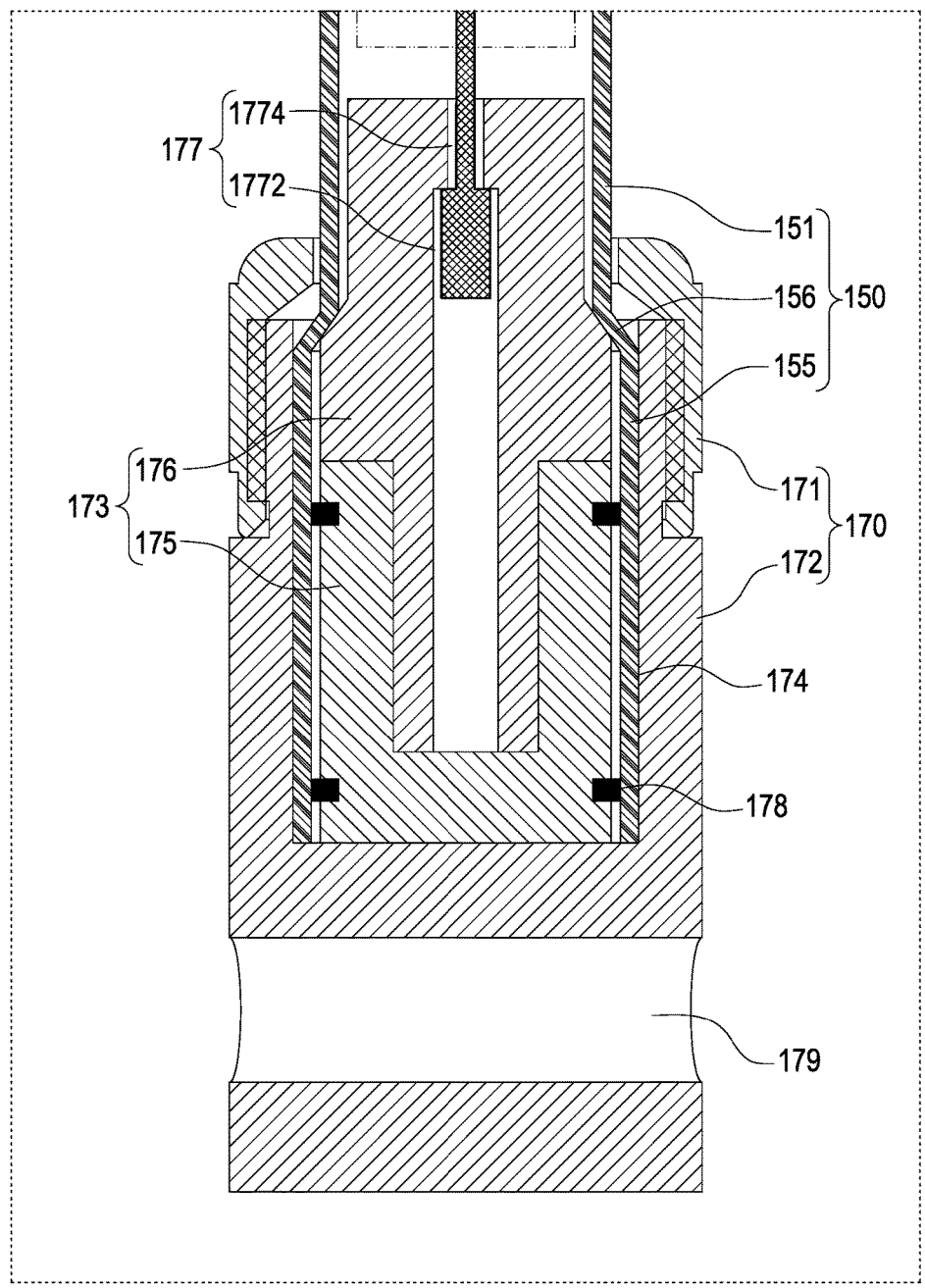
FIG. 9 is a partially enlarged view of Part B in FIG. 6.

As shown in FIG. 4 and FIG. 9, the suspension member 170 is connected to another end of the flexible outer tube 150. The flexible supporting unit 180 is arranged inside the flexible outer tube 150, and one end of the flexible supporting unit 180 is connected to the outer tube securement member 110, whereas another end thereof is connected to the suspension member 170. The magnetic floating ball 210 is moveably mounted onto the flexible outer tube 150 such that when the suspension member 170 pulls the flexible outer tube 150, a force is exerted onto the flexible supporting unit 180 in order to support the flexible outer tube 150.

The suspension member 170 comprises a second connector cap 171, a second connector seat 172 connected to the second connector cap 171 and a plug 173. The second connector seat 172 forms a receiving space 173, and the plug 173 can be received inside the flexible outer tube 150 and can be commonly received inside the receiving space 174. The second connector cap 171 is mounted onto the flexible outer tube 150 and attached onto the second connector seat 172 for holding the flexible outer tube 150.

The plug 173 further includes a column seat 175, a column member 176 inserted onto the column seat 175 and a lower securement hole 177 formed on the column member 176. The lower securement hole 177 can be provided for the flexible supporting unit 180 to penetrate therethrough, and another end of the flexible supporting unit 180 is connected to a second securement member 184. The lower securement hole 177 comprises a first lower hole 1772 and a second lower hole 1774 connected to each other. The second securement member 184 is positioned on the first lower hole 1772 and abuts again the bottom end of the second lower hole 1774. The flexible supporting unit 180 penetrates through the second lower hole 1774.

In the embodiment as shown in FIG. 9, the inner diameter of the first lower hole 1772 is greater than the inner diameter of the second lower hole 1774 in order to allow the second securement member 184 to be positioned and clamped inside the first lower hole 1772. The column member 175 is inserted and attached onto the column seat 176 such that the lower securement hole 177 is sealed. Moreover, in this embodiment, it further comprises at least one waterproof ring 178. The waterproof ring 178 is arranged between the outer surface of the column seat 175 and flexible outer tube 150. Accordingly, it allows the suspension member 170 to have the ability to prevent gas or liquid 20 to infiltrate into the receiving space 174 in order to prevent damages of the components of, such as, detection module 160 etc.

Furthermore, the flexible outer tube 150 further includes a tube member 151, a second expanded portion 155 and a second tapered section 156 connected between the tube member 151 and the second expanded portion 155. The tubular diameter of the second expanded portion 155 is greater than the tubular diameter of the tube member 151, and the plug 173 is arranged inside the second expanded portion 155.

As shown in FIG. 10, in this embodiment, it further comprises a heavy object 220 connected to the suspension member 170. The second connector seat 172 of the suspension member 170 further includes a through hole 179 formed thereon and provided for the positioning of the heavy object 220 made of, such as, stainless steel, thereon in order to pull the suspension member 170. In other words, when the heavy object 220 pulls the suspension member 170, the suspension member 170 is able to pull the flexible outer tube 140, and a force is exerted onto the flexible supporting unit 180 at the same time in order to support the flexible outer tube 150. Accordingly, it is able to effectively prevent the flexible outer tube 150 from excessive elongation of deformation, thereby increasing the measurement accuracy and useful lifetime Moreover, the magnetic floating ball 210 is mounted onto the flexible outer tube 150 such that it is able to move between the second flexible tube 194 of the protective flexible tube 190 and the suspension member 170 relatively according to the liquid level of the liquid 20.

It shall be noted that the two ends (first securement member 182 and the second securement member 184) of the flexible supporting unit 180 are secured via the upper securement hole 142 and the lower securement hole 177 respectively. When the first connector cap 200 or the similar second connector cap 171, such as a screw nut, are fastened onto the first connector seat 202 or the second connector seat 172 respectively, the flexible outer tube 150 can be secured inside the outer tube securement member 110 or the suspension member 170 respectively. At this time, the flexible supporting unit 180 is able to linearly connect to the outer tube securement member 110 and the suspension member 170 simultaneously in order to prevent the situation where the flexible outer tube 150 deforms with elongation due to the weight of the heavy object 220 or the own weight of the flexible float-type liquid level measurement device 100 after a long period of time; therefore, the tensile strength is increased and the useful lifetime is prolonged.

The above is provided to describe the preferred embodiments of the present invention, which shall not be treated as limitations to the claims of the present invention. Other equivalent modifications utilizing the spirit of the patent of the present invention shall all be deemed to be within the scope of the claims of the present invention.

What is claimed is:
1. A flexible float-type liquid level measurement device, comprising:
   an outer tube securement member;
   a signal connection module arranged on one end of the outer tube securement member;
   a flexible outer tube having one end connected to the outer tube securement member, the flexible outer tube having a detection module installed therein, the detection module electrically connected to the signal connection module;
   a suspension member connected to another end of the flexible outer tube;
   a flexible supporting unit arranged inside the flexible outer tube, the flexible supporting unit having one end connected to the outer tube securement member and another end connected to the suspension member; and a magnetic floating ball moveably mounted onto the flexible outer tube such that when the suspension member pulls the flexible outer tube, a force is exerted onto the flexible supporting unit in order to support the flexible outer tube.

2. The flexible float-type liquid level measurement device according to claim 1; wherein the outer tube securement member comprises a cover, a metal outer tube connected to the cover and a metal securement seat arranged inside the metal outer tube;

wherein the flexible outer tube is clamped between the metal outer tube and the metal securement seat, and the metal securement seat is formed of an upper securement hole for one end of the flexible supporting unit to be positioned therein.

3. The flexible float-type liquid level measurement device according to claim 2; wherein one end of the flexible supporting unit is connected to a first securement member, the upper securement hole comprises a first upper hole and a second upper hole connected to each other, the first securement member is positioned on the first upper hole and abuts against a top end of the second upper hole, the flexible supporting unit penetrates through the second upper hole.

4. The flexible float-type liquid level measurement device according to claim 3; wherein an inner diameter of the first upper hole is greater than an inner diameter of the second upper hole, the metal securement seat further includes a through hole, the detection module uses a fastening member for penetrating into the through hole in order to attach onto the metal securement seat.

5. The flexible float-type liquid level measurement device according to claim 2; wherein the flexible outer tube includes a tube member, a first expanded portion mounted onto the metal securement seat and a first tapered section connected to the tube member and the first expanded portion; wherein the a tubular diameter of the first expanded portion is greater than a tubular diameter of the tube member, the metal outer tube includes an air-tight structure corresponding to the first tapered section.

6. The flexible float-type liquid level measurement device according to claim 1, further comprising a protective flexible tube for protecting the detection module, a first connector cap mounted onto the protective flexible tube and a first connector seat connected to the first connector cap; wherein the protective flexible tube is mounted onto the flexible outer tube, and a length of the protective flexible tube is smaller than a length of the flexible outer tube.

7. The flexible float-type liquid level measurement device according to claim 6, wherein the protective flexible tube further comprises a first flexible tube and a second flexible tube mounted onto the first flexible tube.

8. The flexible float-type liquid level measurement device according to claim 7, wherein an outer wall of the second flexible tube includes a blocking portion circumferencing thereon, the blocking portion is provided to abut against one end of the first flexible tube, and another end of the first flexible tube abuts against the outer tube securement member.

9. The flexible float-type liquid level measurement device according to claim 1, wherein the suspension member comprises a second connector cap, a second connector seat connected to the second connector cap and a plug, the second connector seat is formed of a receiving space, the plug is received inside the flexible outer tube and commonly received inside the receiving space, the second connector cap is mounted onto the flexible outer tube and attached onto the second connector seat in order to hold the flexible outer tube.

10. The flexible float-type liquid level measurement device according to claim 9, wherein the plug further comprises a column seat, a column member inserted onto the column seat and a lower securement hole formed on the column member, the lower securement hole is provided for the flexible supporting unit to penetrate therethrough, and another end of the flexible supporting unit is connected to a second securement member.

11. The flexible float-type liquid level measurement device according to claim 10, wherein the lower securement hole comprises a first lower hole and a second lower hole connected to each other, the second securement member is positioned on the first lower hole and abuts against a bottom end of the second lower hole, the flexible supporting unit penetrates through the second lower hole.

12. The flexible float-type liquid level measurement device according to claim 11, wherein an inner diameter of the first lower hole is greater than an inner diameter of the second lower hole, the column member is attached onto the column seat such that the lower securement hole is sealed.

13. The flexible float-type liquid level measurement device according to claim 10, further comprising a waterproof ring, wherein the waterproof ring is arranged between an outer surface of the column seat and the flexible outer tube.

14. The flexible float-type liquid level measurement device according to claim 1, wherein another end of the flexible outer tube further comprises a tube member, a second expanded portion and a second tapered section connected between the tube member and the second expanded portion, a tubular diameter of the second expanded portion is greater than a tubular diameter of the tube member, the plug is arranged inside the second expanded portion.

15. The flexible float-type liquid level measurement device according to claim 1, further comprising an object connected to the suspension member, wherein the suspension member further includes a through hole formed thereon and provided for the object to be positioned thereon in order to pull the suspension member.

* * * * *